United States Patent
Becker et al.

(10) Patent No.: US 6,428,102 B1
(45) Date of Patent: Aug. 6, 2002

(54) VEHICLE SEAT WITH AN ADJUSTMENT FOR THE SEAT'S DEPTH

(76) Inventors: Burckhard Becker, Obenkatternberg 25, 42655 Solingen; Ernst-Reiner Frohnhaus, Hammerstr. 13, 42699 Solingen, both of (DE)

( * ) Notice: Subject to any disclaimer, the term of this patent is extended or adjusted under 35 U.S.C. 154(b) by 0 days.

(21) Appl. No.: 09/504,253

(22) Filed: Feb. 15, 2000

(30) Foreign Application Priority Data

Mar. 25, 1999 (DE) .......................................... 199 13 503

(51) Int. Cl.[7] ................................................ B60N 2/00
(52) U.S. Cl. ...................................................... 297/337
(58) Field of Search ................. 297/340, 337, 297/284.11

(56) References Cited

U.S. PATENT DOCUMENTS 5,733,005 A * 3/1998 Aufrere et al.

FOREIGN PATENT DOCUMENTS

| DE | 196 45 772 | 5/1998 |
|---|---|---|
| DE | 196 46 470 | 5/1998 |
| DE | 197 40 045 | 3/1999 |

* cited by examiner

Primary Examiner—Milton Nelson, Jr.
(74) Attorney, Agent, or Firm—Akerman Senterfitt

(57) ABSTRACT

A vehicle seat equipped with a seat part and an adjustment device for adjusting the depth of the seat part. The vehicle seat has a seat carrier consisting essentially of two lateral parts and is provided with a seat cushion carrier. The seat cushion carrier has a front transverse part which is connected to the two lateral parts of the seat carrier in a longitudinal guide, which is orientated in a longitudinal direction of the vehicle seat. The seat cushion carrier further has an adjusting device for adjusting the position of the front transverse part in the longitudinal guide, a rear transverse part which is hinged in an inferior drag link to the two lateral parts, in a rear area thereof, and a spring which is arranged between the front transverse part and the rear transverse part above the inferior drag link.

11 Claims, 1 Drawing Sheet

VEHICLE SEAT WITH AN ADJUSTMENT FOR THE SEAT'S DEPTH

FIELD OF THE INVENTION

Figure 1:
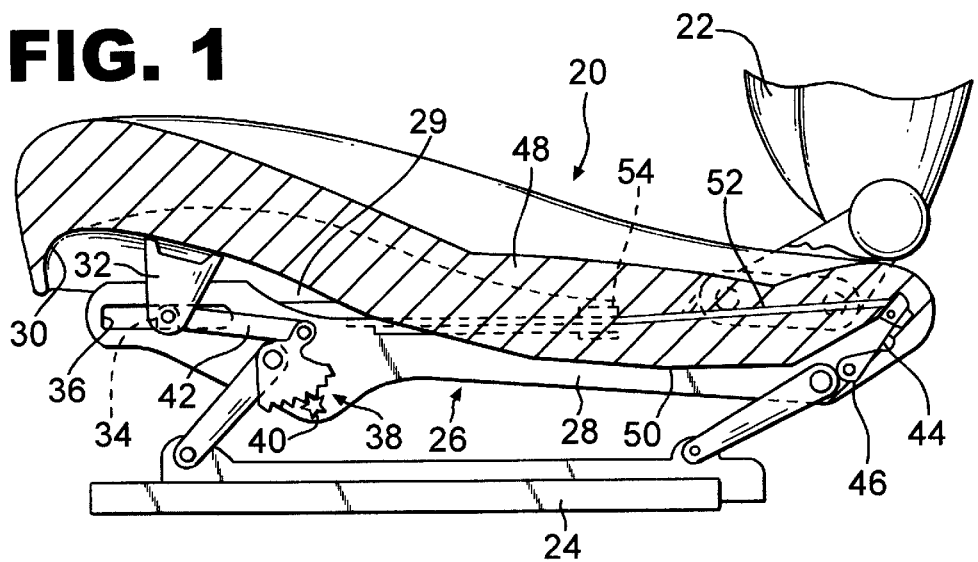

The invention relates to a vehicle seat with an adjustment for the seat's depth. In principle, an adjustment for the depth of seats in vehicles is well-known. Reference is made for example to the DE 197 40 045 A1, DE 196 46 470.6 A1 and DE 196 45 772 A1.

BACKGROUND OF THE INVENTION

The last mentioned publication discloses a vehicle seat with a seat carrier being composed of two parts, a front part or front transverse part and a U-shaped rear part. The two parts are joined together via two lateral connecting areas. For the depth adjustment of the seat, the lateral connecting areas are both provided with a long hole in which a peg is guided. A device for the mechanical displacement and fixation of the two parts relative to one another is provided.

In principle, this vehicle seat has proved effective. There is however an interest for having its construction further simplified, particularly for doing without the lateral connecting areas and the device for the mechanical displacement and fixation assigned to them. That is where the invention comes to bear.

SUMMARY OF THE INVENTION

The object of the invention is to develop the vehicle seat of the type mentioned above in such a way that its construction is simplified and that the installation and the upholstery may be done directly on the complete seat carrier.

The solution of the invention is provided by a vehicle seat having the features of claim 1.

In this vehicle seat, the seat cushion carrier is no longer a single to be handled, mechanically coherent component part. It is now assigned to the seat carrier. The depth adjustment of the seat is done by adjusting the front transverse part relative to the seat carrier, namely to a front area of the seat carrier. The front and rear transverse parts are not directly joined together. They are only connected via the spring area. The rear transverse part in its turn is arranged directly on the seat carrier, more particularly by articulation. Said rear transverse part is essentially designed as an oblong rectangle which is pivotably connected with the hindmost area of the seat carrier by its long lower edge. In the area of its long upper edge it is provided with connecting means for hooking up each single spring of the spring area.

Thus, the operating device for the depth adjustment of the seat may be accommodated in the front part of the seat carrier. From an ergonomic point of view, this is advantageous. A transverse bar located in the central part of the seat as it is provided according to DE 196 45 772 is no longer necessary. Thus, a longer spring excursion is given or less space is needed underneath the seat carrier to achieve the same comfort of springiness.

The rear transverse part is held against the effect of the springs in the spring area in an essentially vertical position by means of an adequate means. To this purpose, the invention suggests arranging a connecting rod between the rear transverse part and each lateral part. Said connecting rod is hinged to the rear transverse part above the lower drag link on one hand. On the other it is slidably guided in a sliding rail provided in each side part. This connecting rod enables the rear transverse part to execute a slewing motion while being further guided.

In an alternative solution, a torsion spring, more particularly a leg spring, is accommodated between the rear transverse part and each lateral part. Said leg spring prestresses the rear transverse part round the lower swivelling axis in such a way that the upper edge of the rear transverse part is pivoted backwards against the action of the spring area. Here too, the position adopted by the rear transverse part is essentially upright thanks this time to the elasticity conferred by the torsion spring. The two just described alternatives may be combined. Other solutions are possible. Instead of a connecting rod, a pressure spring may be used for example on either side of the seat between the rear transverse part and each lateral part. Said pressure spring however acts upon a solid place of the lateral part.

In a preferred embodiment, the adjusting device has an adjustable multiturn actuation arranged on a seat carrier and provided with a rotatable transverse bar cross-tying the two seat carriers and also with one connecting rod each which is linked by one end to the front transverse part. The design of the adjusting device between the front transverse part and the part of the seat carrier located underneath thus results simple.

In the preferred embodiment a long hole, which serves as a longitudinal guiding, is provided in each seat carrier. A slider adapted to the long hole and connected to the front transverse part engages the long hole. The shape of the long hole is discretional. It may for example be straight but it can also be bent. Thanks to this, additionally to the depth adjustment of the seat, the front edge of the seat may also be positioned. In principle and according to the invention, this is altogether possible by designing the shape of the long hole accordingly.

In practice, the distance between the front transverse part and the rear transverse part varies. The change in distance is compensated by the spring area. A padding arranged on the seat carrier and on the seat cushion carrier connected to it, for example a foam part, is designed in such a way that the corresponding change of length may be absorbed in the depth direction of the seat. The same is true for a padding material in which the padding body is wrapped up on the outside.

BRIEF DESCRIPTION OF THE INVENTION

Figure 2:
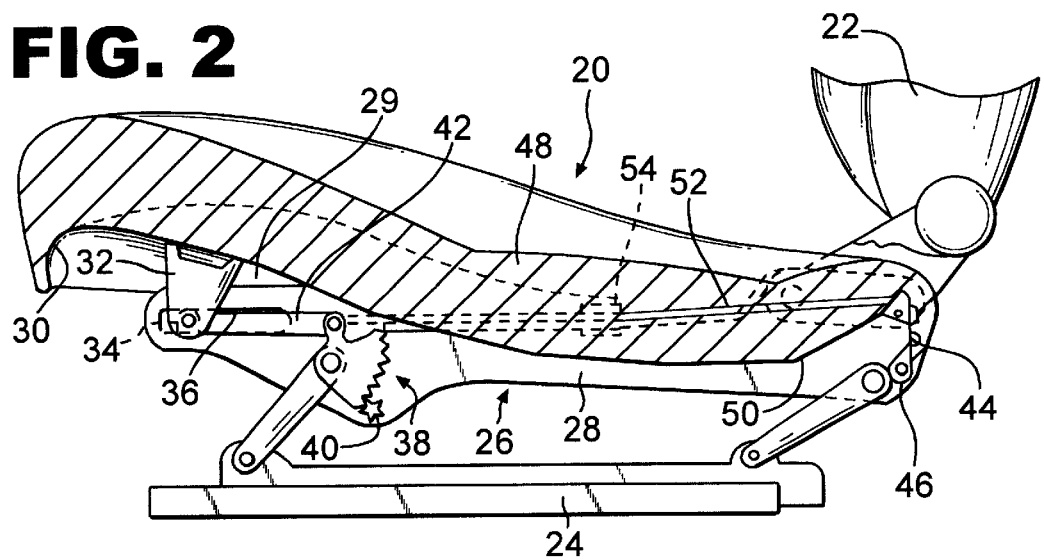
Figure 3:
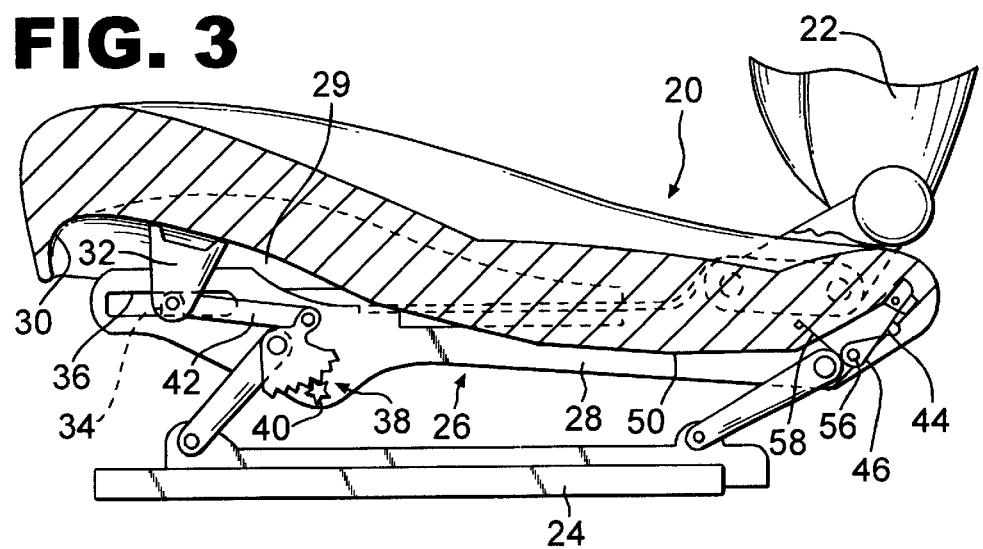

Further advantages and characteristics of the invention will become clear in the other claims and in the following description of embodiments of the invention. These embodiments are not limiting the scope of the invention and are explained in more details with the aid of the drawing. The drawing shows in:

FIG. 1: a side view of a vehicle seat showing, below the back of the seat, a longitudinal section with a vertical cutting plane in the depth direction of the seat, with a connecting rod. The position shown is approximately the middle position of the adjustment for the seat's depth;

FIG. 2: a representation according to FIG. 1, the position shown this time being almost the deepest possible; and FIG. 3: a representation similar to FIG. 1, the connecting rod having been replaced by a torsion spring.

DETAILED DESCRIPTION OF EMBODIMENTS OF THE INVENTION

The vehicle seat shown has a seat area 20 and a back of seat 22. The seat area 20 is connected to a longitudinal adjusting device 24 via an underframe composed of a front and a rear crank. As already disclosed, said longitudinal adjusting device consists of two couples of rails.

The seat area 20 has a seat carrier 26 in which the two couples of cranks are engaging and on which the back of seat 22 is arranged by means of an articulation for the seat back. The seat carrier 26 is essentially composed of two side parts 28, which are located on both sides of the seat and which are essentially extending over the whole depth of the seat. A seat cushion carrier 29 is mechanically connected to the seat carrier 26. It has a front transverse part 30 having the shape of an inverted U and extending from one side part 28 to another side part 28. A supporting part 32 belongs to it on both sides and carries a slider 34. Said slider is slidably guided in a long hole 36 of the side part 28. The slider 34 and the long hole 36 constitute a longitudinal guide which is actually running in direction of the seat's depth. The guide may additionally be provided with a gradient, a curve or the like, so that the seat may not only be adjusted in depth but that, at the same time, the front edge of the seat may be adjusted in height.

The longitudinal guiding may be of different designs. The seat carrier 26 may for example be connected in its front area to the front transverse part 30 via an oscillating crank, a parallelogram suspension may be provided, and so on.

The position of the slider 34 in the long hole 36 is adjusted by a multiturn actuation 38. Said actuation has a driven pinion 40 that horizontally swings a toothed quadrant which is pivotable around the upper link point of the front oscillating crank communicating with the longitudinal adjusting device 24. Via a connecting rod 42 acting off-center and being articulated to the slider 34, the rotational movement is converted into a linear one and thus into a movement along the long hole 36. The free length of the long hole 36 minus the width of the slider 34 equals the setting range of the front transverse part 30 relative to the seat carrier 26.

In the rear area, the seat cushion carrier is materialized by a rear transverse part 44 that connects the two rear end areas of the lateral parts 28 together. To this purpose the rear transverse part 44, which is essentially designed as a longish, nearly vertically standing rectangle, is hinged in the vicinity of its lower longitudinal edge to the rear area of either lateral part 28. The axle of the articulation is referred to with numeral 46 and is named an inferior drag link. The rear transverse part 44, has been stiffened by adding a bead or a bulge, said bead or bulge having been welded on or arranged in another way. In its upper area, it is bent and rounded so that it does not cut into a padding body 48 located just on top and also above the front traverse part 30. At last, the rear transverse part 44 has, in its upper end area, hook-on means for a spring area 50 consisting in single springs bent to the shape of a rectangular curve and acting with its front end upon the front transverse part 30. The spring area 50 is represented in the Figure by a nodal line with altogether five nodes, whereas the nodes are representing the parts of the springs which are running across the plane of projection. The lines are representing the parts of each spring which are running in the plane of projection.

A connecting rod 52 is hinged to the upper end area of either side of the rear transverse part 40. Its length amounts to approximately half of the length of the spring area 50. Its front end is located in the area of a slider 54 which is slidably guided on an upper edge of the corresponding lateral part 28. In the shown position of the seat underframe, the edge is essentially parallel to the adjusting direction of the longitudinal adjusting device.24. Other embodiments of the longitudinal guiding of the connecting rod's 52 front end in the corresponding lateral part 28 are possible, e.g. by providing a long hole with slider in a way similar to the one used in the front area of the seat carrier 26, a guiding via an oscillating crank, and so on. The connecting rod 52 guarantees that a moment of hold is acting upon the rear transverse part 44, said moment of hold acting in the direction opposed to the direction of the torque due to the action of the spring area 50. Thus, the rear transverse part 44 is kept in the position shown.

In the representation according to FIG. 2, the slider 34 is in its foremost position inside the long hole 36. The seat cushion carrier 29 composed of the front transverse part 30, the rear transverse part 44 and the spring area 50 is now at the maximum of its length. The change in length is essentially due to the lengthening of the spring area 50. This again entails an increased tensile force at the upper end of the rear transverse part 44 whereas the rear transverse part adopts a steeper position than in FIG. 1. The length gained in the front part of the seat is partially compensated or deducted in the rear area of the seating. Since this area is located underneath the back 22 of the seat, the shortening is not noticeable by the user.

In the embodiment according to FIG. 3, no connecting rod is provided. Its function has been taken over by a torsion spring 56 arranged on either side of the seat. It acts upon the inferior drag link 46. By means of a spring leg 58 which is placed in front in the drawing, it is propped against the lateral part 44 and pushes it to th back, in the opposite direction to the tensile direction of the spring area 50.

A line connecting the front and rear points of application of the spring area 50 passes essentially through the front transverse part 30. The spring area is curved downwards so that more place is made available for a padding body 48.

What is claimed is:

1. A vehicle seat with a seat means and an adjustment for a depth of the seat means, wherein the vehicle seat has a seat carrier consisting essentially of two lateral parts and a seat cushion carrier, wherein said seat cushion carrier comprises:

a front transverse part connected to the two lateral parts of the seat carrier by a longitudinal guiding means, wherein the longitudinal guiding means is orientated in a longitudinal direction of the vehicle seat;

an adjusting device for adjusting the position of the front transverse part in the longitudinal guiding means;

a rear transverse part which is hinged in an inferior drag link to the two lateral parts, in a rear area [thereof] of the two lateral parts; and a spring means having a front end and a rear end, the front end being linked to the front transverse part and the rear end being linked to the rear transverse part in an area of the rear transverse part which is above the inferior drag link.

2. The vehicle seat according to claim 1, wherein a connecting rod is provided, wherein said connecting rod is arranged between the rear transverse part and each of the two lateral parts, said connecting rod having two ends, said connecting rod being hinged on one of the two ends to the rear transverse part above the inferior drag link and being on the other of the two ends slidably guided in a sliding rail of each of the two lateral parts.

3. Vehicle seat according to claim 1, wherein a torsion spring, more particularly a leg spring, is accommodated between the rear transverse part and each lateral part, said leg spring prestressing the rear transverse part round its lower swivelling axis in such a way that the upper edge of the rear transverse part is pivoted backwards against the action of the spring area.

4. The vehicle seat according to claim 1, wherein t he adjusting device has an adjustable multiturn actuation means arranged on the seat carrier, is provided with a rotatable transverse bar cross-tying the two lateral parts of the seat carrier, and is further provided with a connecting rod, wherein the connecting rod has two ends and is linked by one end to the front transverse part.

5. The vehicle seat according to claim 1, wherein a seat underframe is provided, wherein the seat underframe connects the seat carrier to a longitudinal adjustment device.

6. The vehicle seat according to claim 1, wherein the vehicle seat is provided with a back of the seat and the rear transverse part is located essentially underneath the back of the seat.

7. The vehicle seat according to claim 1, wherein, in the depth direction of the seat, the transverse part has a length which is shorter than half of the complete seat depth of the seat carrier.

8. The vehicle seat according to claim 1, wherein a padding body is located above the front transverse part, the spring means and the rear transverse part.

9. The vehicle seat according to claim 8, wherein the padding body is a foam part.

10. The vehicle seat according to claim 1, wherein a long hole, which serves as the longitudinal guiding means, is provided in each lateral part of the seat carrier, a slider is provided and is arranged in the long hole, the slider being adapted to the long hole and being connected to the front transverse part.

11. The vehicle seat according to claim 10, herein the spring means has two ends and an active line of the spring means connecting the two ends of the spring means passes essentially through the slider.

* * * * *